(12) United States Patent
Taylor et al.

(10) Patent No.: US 7,877,420 B2
(45) Date of Patent: Jan. 25, 2011

(54) METHODS AND SYSTEMS FOR INCORPORATING META-DATA IN DOCUMENT CONTENT

(75) Inventors: Brandon V. Taylor, Issaquah, WA (US); Hani Saliba, Seattle, WA (US); Raj Merchant, Kirkland, WA (US); Brian M. Jones, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 319 days.

(21) Appl. No.: 11/167,013

(22) Filed: Jun. 24, 2005

(65) Prior Publication Data

US 2006/0294139 A1 Dec. 28, 2006

(51) Int. Cl.
G06F 7/00 (2006.01)
(52) U.S. Cl. .................................................. 707/806
(58) Field of Classification Search ........................ None
See application file for complete search history.

(56) References Cited

U.S. PATENT DOCUMENTS

| | | | |
|---|---|---|---|
| 5,606,609 | A | 2/1997 | Houser et al. |
| 6,308,168 | B1 | 10/2001 | Dovich et al. |
| 6,629,104 | B1 | 9/2003 | Parulski et al. |
| 6,697,997 | B1 | 2/2004 | Fumijura |
| 6,839,715 | B1 | 1/2005 | Zander |
| 6,973,572 | B1 | 12/2005 | Elliot et al. |
| 7,069,443 | B2 | 6/2006 | Berringer et al. |
| 7,093,195 | B2 | 8/2006 | Lynch et al. |
| 7,343,377 | B1 | 3/2008 | van Opdorp |
| 7,546,334 | B2 | 6/2009 | Redlich et al. |
| 2002/0016800 | A1* | 2/2002 | Spivak et al. ............... 707/523 |
| 2002/0069179 | A1 | 6/2002 | Slater et al. |
| 2002/0069218 | A1 | 6/2002 | Sull et al. |
| 2003/0011639 | A1* | 1/2003 | Webb ......................... 345/808 |
| 2003/0182623 | A1 | 9/2003 | Lynch et al. |
| 2003/0204511 | A1 | 10/2003 | Brundage et al. |
| 2004/0003389 | A1 | 1/2004 | Reynar et al. |
| 2004/0044958 | A1 | 3/2004 | Wolf et al. |
| 2004/0088585 | A1 | 5/2004 | Kaler et al. |
| 2004/0107025 | A1 | 6/2004 | Ransom et al. |
| 2004/0133605 | A1 | 7/2004 | Chang et al. |
| 2004/0153968 | A1 | 8/2004 | Ching et al. |

(Continued)

OTHER PUBLICATIONS

Co-pending Application, entitled "Methods and Systems for Providing a Customized User Interface for Viewing and Editing Meta-Data", Inventors: Brandon v. Taylor et al., filed Jun. 1, 2005.

(Continued)

*Primary Examiner*—Charles Rones
*Assistant Examiner*—Dinku W Gebresenbet
(74) *Attorney, Agent, or Firm*—Shook, Hardy & Bacon L.L.P.

(57) ABSTRACT

Systems and methods are disclosed for incorporating meta-data in document content. The disclosed systems and methods may include initiating an application program configured to generate a document. Furthermore, the disclosed systems and methods may include displaying, by the initiated application program, a property panel. The property panel may be configured to receive meta-data to be associated with the document generated by the application program. Moreover, the disclosed systems and methods may include receiving the meta-data in the property panel and copying the meta-data from the property panel to the document content.

14 Claims, 9 Drawing Sheets

U.S. PATENT DOCUMENTS

| | | | |
|---|---|---|---|
| 2004/0181756 | A1 | 9/2004 | Berringer et al. |
| 2004/0189704 | A1 | 9/2004 | Walsh et al. |
| 2004/0254922 | A1 | 12/2004 | Vincent, III |
| 2005/0050516 | A1 | 3/2005 | Mysore |
| 2005/0086268 | A1* | 4/2005 | Rogers ................ 707/200 |
| 2005/0125660 | A1 | 6/2005 | Raciborski et al. |
| 2005/0132276 | A1 | 6/2005 | Panditharadhya et al. |
| 2005/0144556 | A1 | 6/2005 | Petersen et al. |
| 2005/0160108 | A1 | 7/2005 | Charlet et al. |
| 2005/0177792 | A1* | 8/2005 | Awe et al. ............... 715/740 |
| 2006/0047692 | A1 | 3/2006 | Rosenblum et al. |
| 2006/0064434 | A1* | 3/2006 | Gilbert et al. ........... 707/104.1 |
| 2006/0117073 | A1* | 6/2006 | Bosworth et al. ........ 707/201 |
| 2007/0044010 | A1 | 2/2007 | Sull et al. |
| 2007/0130543 | A1 | 6/2007 | Lee et al. |

OTHER PUBLICATIONS

Co-pending Application, entitled: "Methods and Systems for Creating Document Schema", Inventors: Raj Merchant et al., filed Jun. 1, 2005.

Yen, David C., et al., "The Impact and Implementation of XML on Business-To-Business Commerce", Computer Standards & Interfaces, vol. 24 Issue 4, Sep. 2002, pp. 347-362.

Bi, Yaxin, et al., "Equivalence of UML Semantic Data Models and RDF Content Models", Intelligent Content Management System (ICONS), Document No. IST-2001-32429, Jan. 2003, pp. 2-28.

Jin, Dean, et al., "Where's the Schema? A Taxonomy of Patterns for Software Exchange", IWPC '02, IEEE © 2002, pp. 65-74.

Lyons, Tom, et al., "Development of an e-Business Skillset Enhancement Tool (eSET) for B2B Integration Scenarios,", IDIN 2003, Aug. 21-24, 2003, pp. 118-123.

Microsoft Computer Dictionary, 5th Edition, Microsoft Press, Redmond, WA, © 2002, pp. 247-248.

Park, Sangwon, et al., "A New Query Processing Technique for XML Based on Signature", International Conf. on Database Systems for Advanced Applications, Hong Kong, China, Apr. 18-21, 2001, pp. 22-29.

Bernstein, Philip A., et al., "Industrial-Strength Schema Matching", SIGMOD Record, vol. 33, No. 4, Dec. 2004, pp. 38-43.

Snodgrass, Richard T., et al., "Tamper Detection in Audit Logs", Proc. Of the 30th VLDB Conf., Toronto, Canada, Aug. 31-Sep. 3, 2004, pp. 504-515.

Xavier, Eugene P., "XML Based Security for E-Commerce Applications,", ECBS 2001, Washington, DC, Apr. 17-20, 2001, pp. 10-17.

Park, Sangwon, et al., "XML Query Processing Using Signature and DTD", EC-Web 2002, LNCS 2455, Springer-Verlag, Berlin, Germany, © 2002, pp. 162-171.

Office Action Mailed Nov. 28, 2007 in U.S. Appl. No. 11/166,441.
Notice of Allowance Mailed Oct. 31, 2008 in U.S. Appl. No. 11/166,441.
Office Action Mailed Dec. 11, 2007 in U.S. Appl. No. 11/167,017.
Final Office Action Mailed Jul. 6, 2009 in U.S. Appl. No. 11/167,017.
Office Action Mailed Jan. 21, 2010 in U.S. Appl. No. 11/167,017.

* cited by examiner

METHODS AND SYSTEMS FOR INCORPORATING META-DATA IN DOCUMENT CONTENT

RELATED APPLICATIONS

This patent application is related to U.S. patent application Ser. No. 11/167,017, entitled "METHODS AND SYSTEMS FOR PROVIDING A CUSTOMIZED USER INTERFACE FOR VIEWING AND EDITING META-DATA" and to U.S. patent application Ser. No. 11/166,441, entitled "METHODS AND SYSTEMS FOR CREATING DOCUMENT SCHEMA", both filed concurrently herewith, each of which is assigned to the same assignee as the instant application. The aforementioned patent applications are expressly incorporated herein, in their entirety, by reference.

BACKGROUND

The present invention generally relates to methods and systems for providing a customized user interface. More particularly, the present invention relates to providing a customized user interface for viewing and editing properties on a document.

Meta-data is data that is used to describe other data. The term may refer to detailed compilations such as data dictionaries and repositories that provide a substantial amount of information about each data element. It may also refer to any descriptive item about data, such as the content of an HTML meta tag, a title field in a media file, or even attributes associated with an electronic spreadsheet or word-processing file. A problem exists in that users within enterprises may not take the time to provide meta-data. For example, they may see no value in providing meta-data.

On the other hand, enterprises tend to want meta-data to describe, for example, data content, as their servers and other data repositories fill with valuable documents and other files. Consequently, an enterprise may have too many documents to search through to find desired data. Knowledge workers providing metadata may help the enterprise analyze the documents or other files, but the meta-data must be accurate. Thus, the conventional strategy is to allow knowledge workers to provide metadata. This often causes problems because the knowledge workers may be un-willing to provide quality metadata. For example, the knowledge workers may select the first choice in a list, "misc", or type in a few random letters ("fd") to make a form asking for the meta-data go away. From the knowledge workers' perspective, they may perceive that it may take too much time for little or no perceivable gain.

Furthermore, many users wish to update the meta-data off-line. For example, a document may be downloaded from a server to a client system. However, conventional systems may store schema associated with the meta-data only on the server. Accordingly, with conventional systems, the meta-data cannot be displayed off-line because the schema may reside only on the server and not on the client.

In view of the foregoing, there is a need for methods and systems for providing meta-data more optimally. Furthermore, there is a need for providing a customized user interface for viewing and editing properties on a document. In addition, there is a need for creating document schema usable, for example, when a document is used off-line and updateable when the document has been uploaded after being used off-line.

SUMMARY

Consistent with embodiments of the present invention, systems and methods are disclosed for incorporating meta-data in document content.

In accordance with one embodiment, a method for incorporating meta-data in document content comprising initiating an application program configured to generate a document, displaying, by the initiated application program, a property panel, the property panel configured to receive meta-data to be associated with the document generated by the application program, receiving the meta-data in the property panel, and copying the meta-data from the property panel to the document content.

According to another embodiment, a system for incorporating meta-data in document content, the system comprises a memory storage for maintaining a database and a processing unit coupled to the memory storage, wherein the processing unit is operative to initiate an application program configured to generate a document, display, by the initiated application program, a property panel, the property panel configured to receive meta-data to be associated with the document generated by the application program, receive the meta-data in the property panel, and copy the meta-data from the property panel to the document content.

In accordance with yet another embodiment, a computer-readable medium which stores a set of instructions which when executed performs a method for incorporating meta-data in document content, the method executed by the set of instructions comprising initiating an application program configured to generate a document, displaying, by the initiated application program, a property panel, the property panel configured to receive meta-data to be associated with the document generated by the application program, receiving the meta-data in the property panel, and copying the meta-data from the property panel to the document content.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
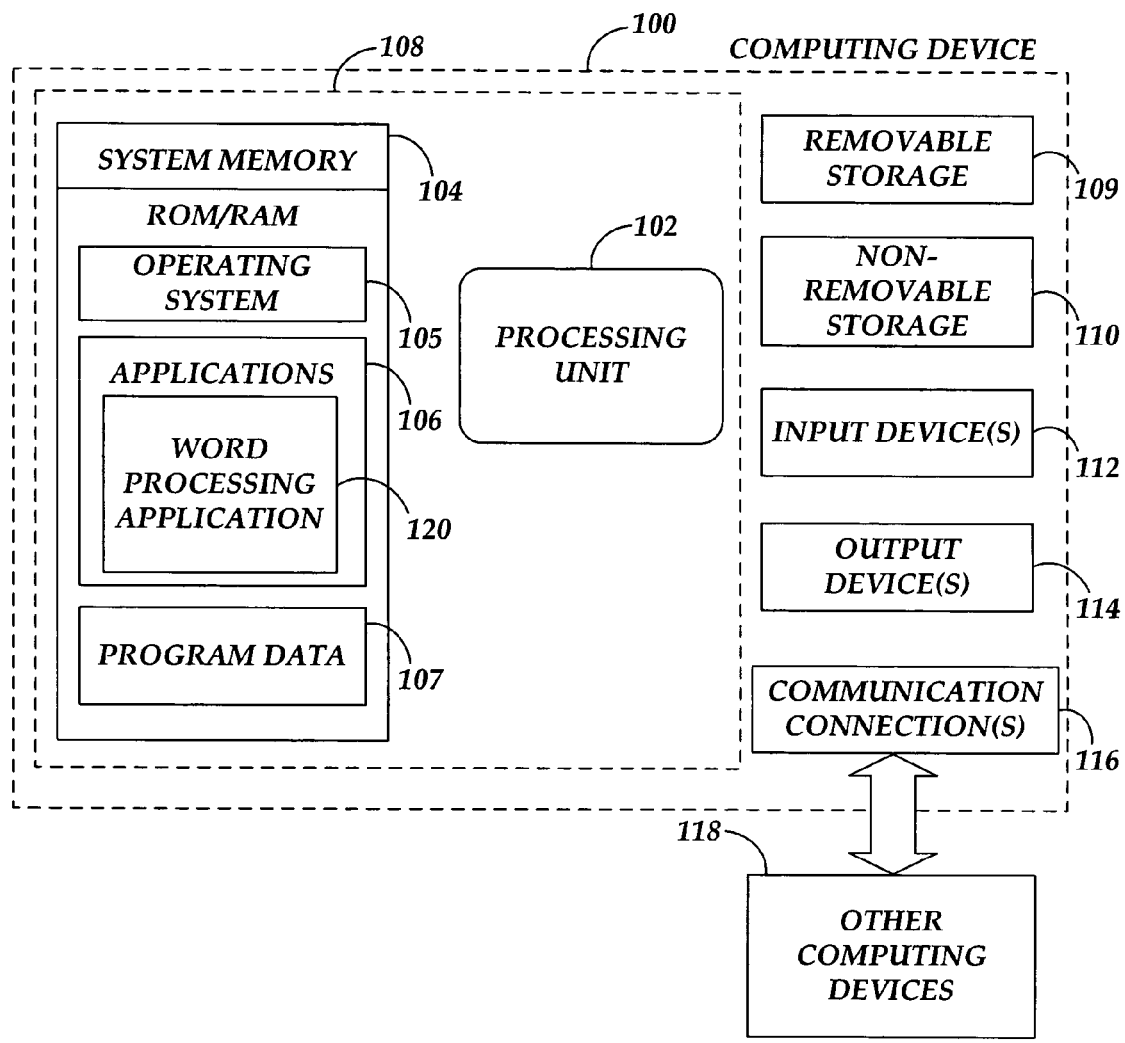
FIG. 1 is a block diagram of an exemplary computing device consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding stages to the disclosed methods. Accordingly, the following detailed description does not limit the invention. Instead, the proper scope of the invention is defined by the appended claims.

Systems and methods consistent with embodiments of the present invention provide a customized user interface, incorporate meta-data in document content, and create document schema. For example, embodiments of the invention may provide a property panel poised to allow users to easily enter metadata while being a seamless part of their document authoring experience. The property panel may allow users to specify all document properties at once, in one place, at any point in their document. One value to the user may be that any property specified in the property panel may comprise properties the user does not have to provide at save time or even later as optional properties. One goal may be to save them time. In addition, this may provide a good way to expose a user to the properties that help describe their document when it is relevant to the user (i.e. at authoring time—not save time) without being obtrusive to the user.

In addition, enterprises may want the ability to control the layout and design of the property-entry. For example, enterprises often have specific process that already exist that they want their users to be able to continue without having to learn a "new" way to do things. Consistent with embodiments of the inventions, the property panel may enable a solution designer to perform rich customizations that may be shown in a user interface (UI) for all documents of a specific type that it is applied to. This may include, for example, adding company logos, pictures, color schemes, and re-ordering property fields. Moreover, solution designers can organize them in different "views" so that they may be grouped logically for how users think about their work. Finally, solution designers may also enforce business logic and custom data connections and lookups, allowing them to perform virtually any type of computation that is necessary to get the data into a desired state. Once customized, an easy mechanism may be provided to associate this version with their document type to allow that document to always show this customized property-entry form within an application program.

A user who is authoring a document that is either going to be a template to re-use or is an existing document that references certain metadata throughout their document may re-use that metadata everywhere without copying it. Consistent with embodiments of the invention, a user may be allowed to apply references throughout their document that refers to a piece of data that may be show in the property panel. In this way, if the user changes data in the property panel, it may change this data everywhere else in the document and vice versa. This process may be referred to as "data-binding", for example, binding the data to some reference in the document that may expect that data to show up there. Consistent with embodiments of the invention, the data may be "dragged" and "dropped" from the data (properties) themselves. This may reduce the overhead for a user to setup a document to respect meta-data it may contain and may allow the user to just apply references throughout their document as easily as inserting any object into their document.

Data-binding may be a powerful capability for a few reasons. First, it may reduce the possibilities that someone may change meta-data somewhere and forget to change it elsewhere: For example, this may ensure that a document may be automatically up-to-date when it references a lot of the same data throughout. Second, it may enable users to change the properties that are bound to content outside of the application itself. This could be accomplished through extensible markup language (XML) manipulation or other mechanisms. Those changes may automatically be reflected in the document content the next time the document is used without ever having to run an application to do so.

Consistent with embodiments of the invention, the property panel may allow association of custom UI definition with document. Moreover, the property panel may function as a mechanism for displaying document properties, for example, a modeless horizontal task-pane at the top of the application. Furthermore, the data binding may include drag/drop association of property name, value, and control in one step to document content, for example.

Furthermore, embodiments consistent with the invention may provide methods and systems to create extensible markup language (XML) schema definition (XSD) based, for example, on server field schema definition. The aforementioned property panel and data-binding processes may store meta-data (e.g. the properties) displayed in an XML representation to be more easily manipulated. Storing as XML, for example, may allow meta-data to be stored in a common XML data store on a server, for example. Accordingly multiple clients may then interact with the meta-data in an organized fashion.

"Schema" may define the structure and the type of contents that each data element within the property panel may contain. For example, the schema may determine how the meta-data may be displayed in the property panel. Shown below are actual tags and their corresponding schema.

Actual Tags in Use

```
<firstName>Pat</firstName>
<lastName>Jones</lastName>
```

Schema for the Tags:

```
<xsd:element name="firstName" type="xsd:string"/>
<xsd:element name="lastName" type="xsd:string"/>
```

Consistent with embodiments of the invention, meta-data may be stored in a more database friendly structure for quicker access and manipulation. For example, a stored schema of the meta-data may be transformed into an XML schema definition (XSD) that may then be associate and store within the document. This schema may then be later loaded into the data store to support the above referenced property panel and data-binding processes.

In addition to creating the schema, embodiments of the invention may include additional functionality, for example, to add off-line performance. First, the schema may be stored inside the document so that it can be referenced when the document is not connected to a server (i.e. properties may be shown and entered while offline.) Second, a hash of the schema may be created that may be stored with the schema. This hash may then be compared to a hash of the current schema stored on a server. In this way, each time the document is downloaded it may be discovered whether to update the schema or not (instead of always just updating it.)

Referring now to the drawings, in which like numerals refer to like elements through the several figures, aspects of the present invention and an exemplary operating environment will be described. FIG. 1 and the following discussion are intended to provide a brief, general description of a suitable computing environment in which embodiments of the invention may be implemented. While embodiments of the invention may be described in the general context of program modules that execute in conjunction with an application program that runs on an operating system on a personal computer, embodiments of the invention may also be implemented in combination with other program modules.

An embodiment consistent with the invention may comprise a system for incorporating meta-data in document content. The system may comprise a memory storage for maintaining a database and a processing unit coupled to the memory storage. The processing unit may be operative to initiate an application program configured to generate a document. Moreover, the processing unit may be operative to display, by the initiated application program, a property panel, the property panel configured to receive meta-data to be associated with the document generated by the application program. Also, the processing unit may be operative to receive the meta-data in the property panel and copy the meta-data from the property panel to the document content.

Consistent with an embodiment of the present invention, the aforementioned memory, processing unit, and other components may be implemented in a computing device, such as an exemplary computing device 100 of FIG. 1. Any suitable combination of hardware, software, and/or firmware may be used to implement the memory, processing unit, or other components. By way of example, the memory, processing unit, or other components may be implemented with any of computing device 100 or any of other computing devices 118, in combination with computing device 100. The aforementioned system, device, and processors are exemplary and other systems, devices, and processors may comprise the aforementioned memory, processing unit, or other components, consistent with embodiments of the present invention.

Generally, program modules may include routines, programs, components, data structures, and other types of structures that perform particular tasks or implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one exemplary system consistent with an embodiment of the invention may include a computing device, such as computing device 100. In a basic configuration, computing device 100 may include at least one processing unit 102 and a system memory 104. Depending on the configuration and type of computing device, system memory 104 may be volatile (such as RAM), non-volatile (such as ROM, flash memory, etc.) or some combination. System memory 104 may include an operating system 105, one or more applications 106, and may include a program data 107. In one embodiment, application 106 may include a word processing application 120. However, embodiments of the invention may be practiced in conjunction with any application program and is not limited to word processing. This basic configuration is illustrated in FIG. 1 by those components within a dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by a removable storage 109 and a non-removable storage 110. Computer storage media may include volatile and nonvolatile, removable and non-removable media implemented in any method or technology for storage of information, such as computer readable instructions, data structures, program modules, or other data. System memory 104, removable storage 109, and non-removable storage 110 are all examples of computer storage media. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. The aforementioned devices are exemplary and others may be used.

Computing device 100 may also contain a communication connection 116 that may allow device 100 to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein may include both storage media and communication media.

A number of program modules and data files may be stored in system memory 104 of computing device 100, including an operating system 105 suitable for controlling the operation of a networked personal computer, such as the WINDOWS operating systems from MICROSOFT CORPORATION of Redmond, Wash. System memory 104 may also store one or more program modules, such as word processing application program 120 (e.g. WORD from MICROSOFT CORPORATION), and others described below. While executing on processing unit 102, application program 120 may perform processes including, for example, one or more of the stages of the methods described below. The aforementioned process is exemplary, and processing unit 102 may perform other processes. While embodiments of the invention are described in a word processing context, other embodiments may include any type of application program and is not limited to word processing. Other applications 106 that may be used in accordance with embodiments of the present invention may include electronic mail and contacts applications, word processing applications, spreadsheet applications, database applications, slide presentation applications, drawing or computer-aided application programs, etc.

Figure 2:
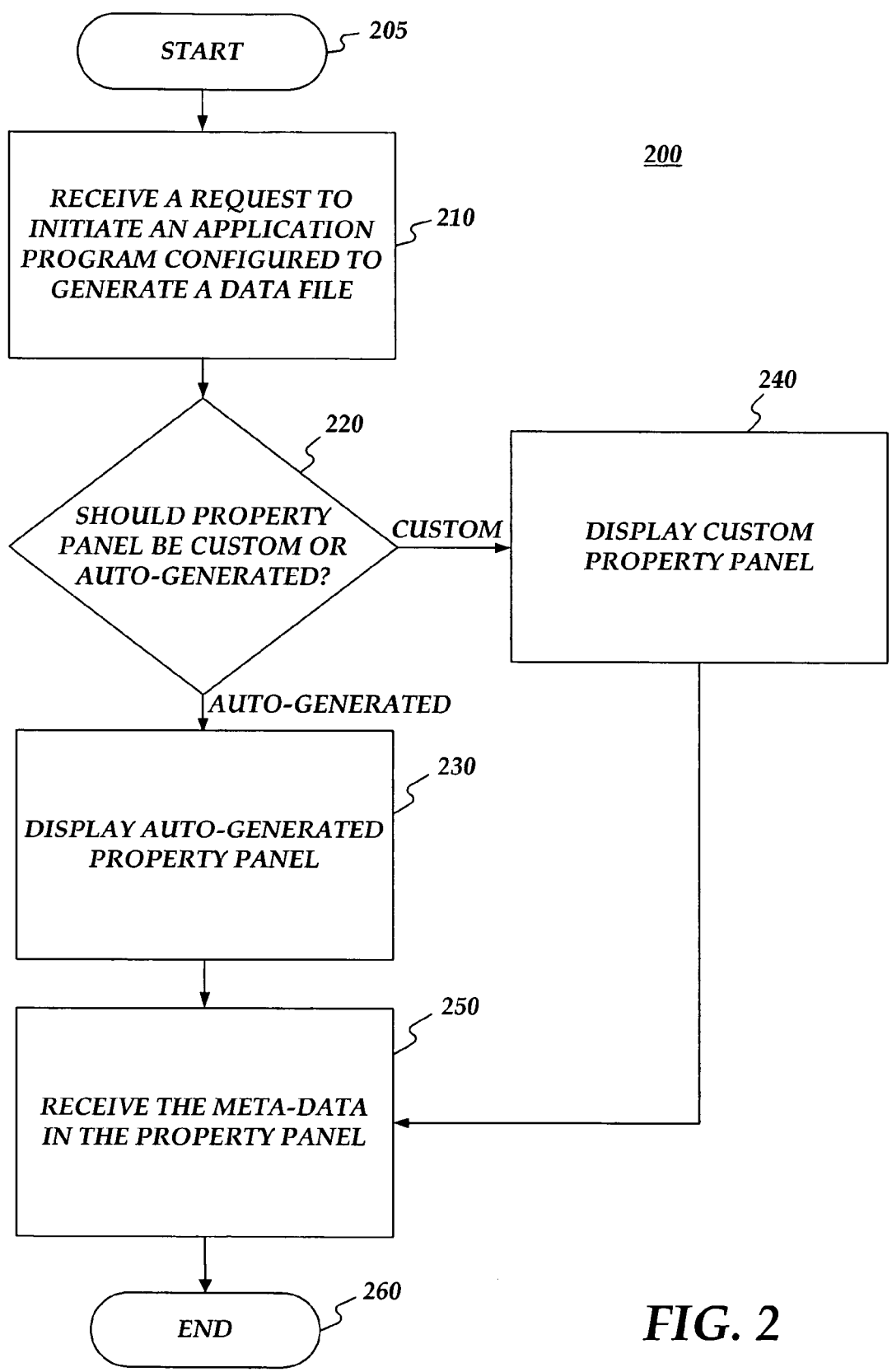
FIG. 2 is a flow chart of an exemplary method for providing a user interface consistent with an embodiment of the present invention.

FIG. 2 is a flow chart setting forth the general stages involved in an exemplary method 200 consistent with the invention for providing a user interface using system 100 of FIG. 1. Exemplary ways to implement the stages of exemplary method 200 will be described in greater detail below. Exemplary method 200 may begin at starting block 205 and proceed to stage 210 where computing device 100 may receive a request to initiate an application program configured to generate a data file. For example, a user may interact with computing device 100 through input device 112 to initiate application program 120. Application program 120's initiation may cause application program 120 to display a visual representation of the data file. For example, the data file may comprise a WORD ".doc" file and the visual representation may comprise a document that the user may wish to add content to.

Figure 3:
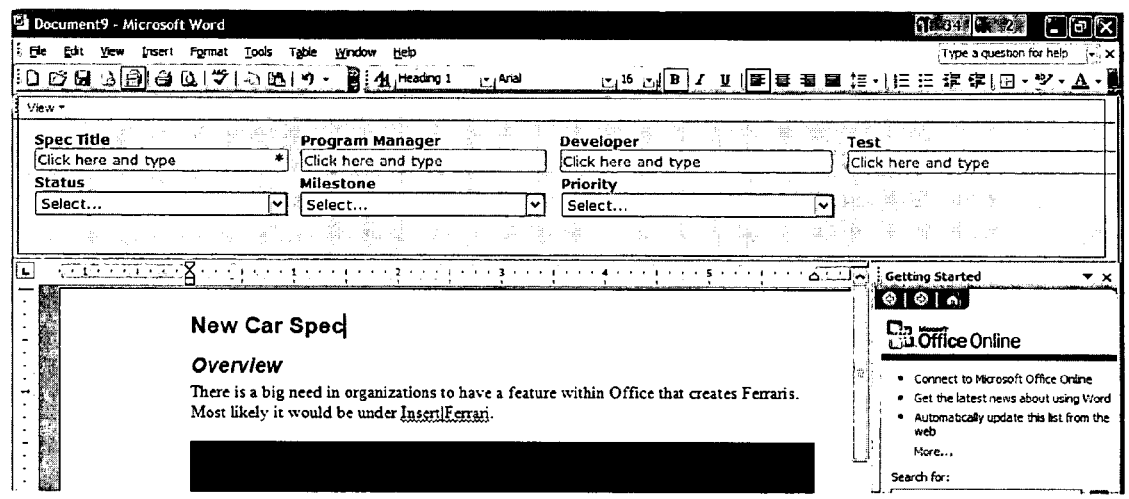
FIG. 3 is a diagram illustrating an exemplary property panel consistent with an embodiment of the present invention.

From stage 210, where computing device 100 receives a request to initiate the application program configured to generate the data file, exemplary method 200 may advance to decision block 220 where computing device 100 may determine if a property panel should be custom or auto-generated. For example, an exemplary property panel is shown in FIG. 3 that may be displayed on one of output devices 114 when application program 120 is initiated. As shown in FIG. 3, the property panel may comprise, for example, a horizontal task-pane that may be docked above the document canvas and below the toolbar region of the application. The property panel may comprise a mode-less task pane that may be resized, moved, and hidden/shown at will by the user, for example. The property panel may look similar to an email envelope, for example, but used for document properties instead. The properties may be laid out, for example, in an order that matches a predetermined format or may be in alphabetical order. For each different property type, an appropriate control may be shown for meta-data entry. The controls are shown in FIG. 3, for example, with standard fonts/sizes matching the application settings.

If computing device 100 determines that the property panel should be auto-generated at decision block 220, exemplary method 200 may continue to stage 230 where computing device 100 may display an auto-generated property panel. For example, in displaying the property panel, application program 120 may use a form. For example, this forms may be either auto-generated by application program 120 (if no custom form is supplied) or may be custom built (by the user for example) and associated with the document. In the custom case, application program 120 may retrieve the form where stored and show it in the same space. In this case an auto-generated form, which application program 120 may default to, may not be used.

Also, the property panel may support additional functionality. For example, the property panel may allow the user to switch between multiple groupings of properties that may be either pre-defined or custom-defined. In addition, the property panel may support data validation. For example, the property panel may indicate when entered properties are invalid (red box around control) or missing (red asterisk) when required.

Figure 4:
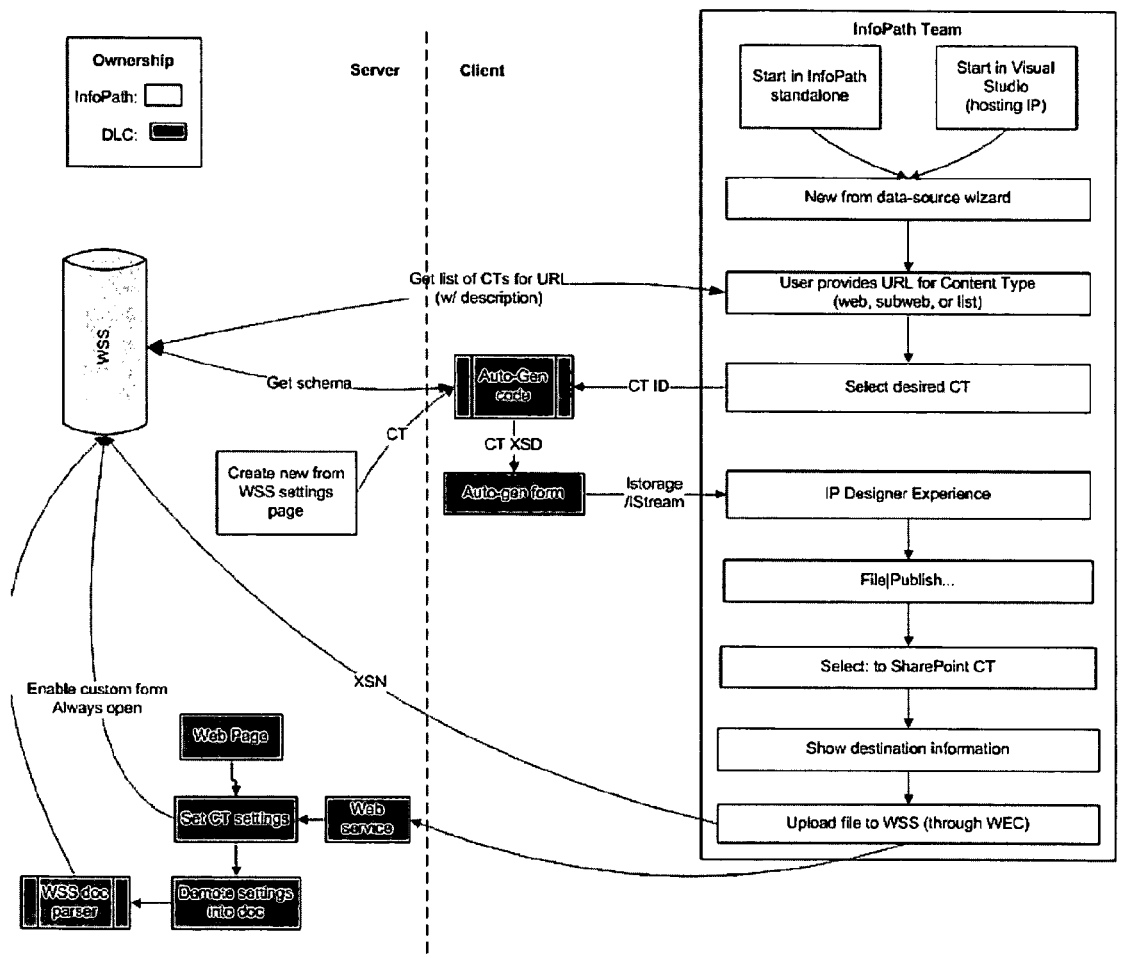
FIG. 4 is a diagram illustrating a process for creating a customized form consistent with an embodiment of the present invention.
Figure 5:
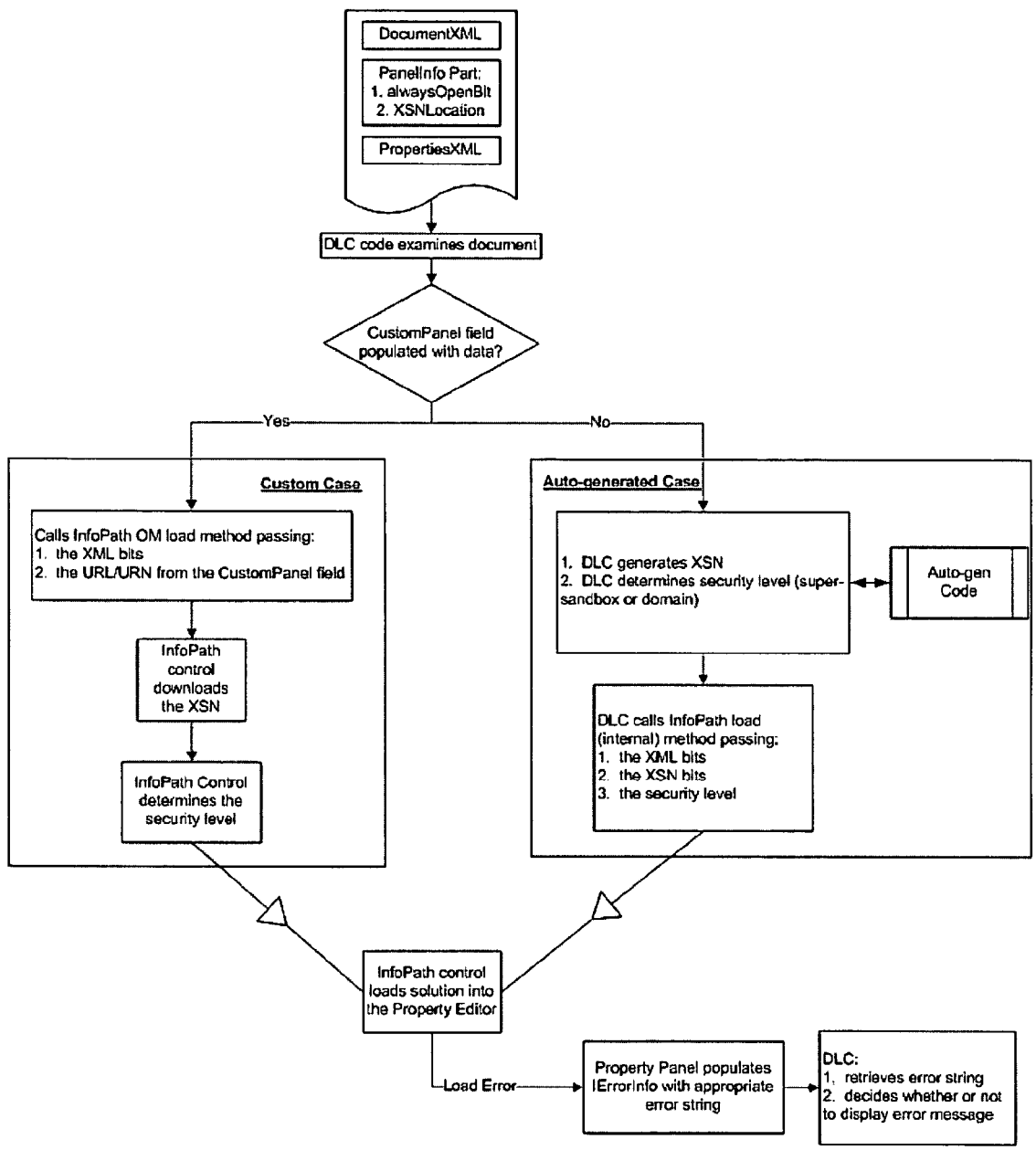
FIG. 5 is a diagram illustrating a process describing how to determine whether to auto-generate a form or use a custom form consistent with an embodiment of the present invention.

However, if computing device 100 determines that the property panel should be custom at decision block 220, exemplary method 200 may continue to stage 240 where computing device 100 may display a custom property panel. For example, FIG. 4 illustrates a process for creating a new customized form and associating it to a document. As shown in FIG. 4, the customizations of this form may occur, for example, in INFOPATH marketed by MICROSOFT CORPORATION of Redmond, Wash. Upon getting the form setup and associated to the document, for example, application program 120 may apply settings to the document that allow it to know where to get the custom form. Alternatively, this process may be manually provided by the user doing the customization and the solution may be deployed to the clients using the form. FIG. 5 illustrates a process for determining whether to auto-generate a form or use specified custom form when opening a document.

From stage 230 where computer device 100 displays the auto-generated property panel or from stage 240 where computing device 100 displays the custom property panel, exemplary method 200 may proceed to stage 250 where computing device 100 may receive the meta-data in the property panel. For example, the user may enter the meta-data into the property panel shown on one of output device 114 using one of input devices 112. After computing device 100 receives the meta-data in stage 250, exemplary method 200 may then end at stage 260.

Figure 6:
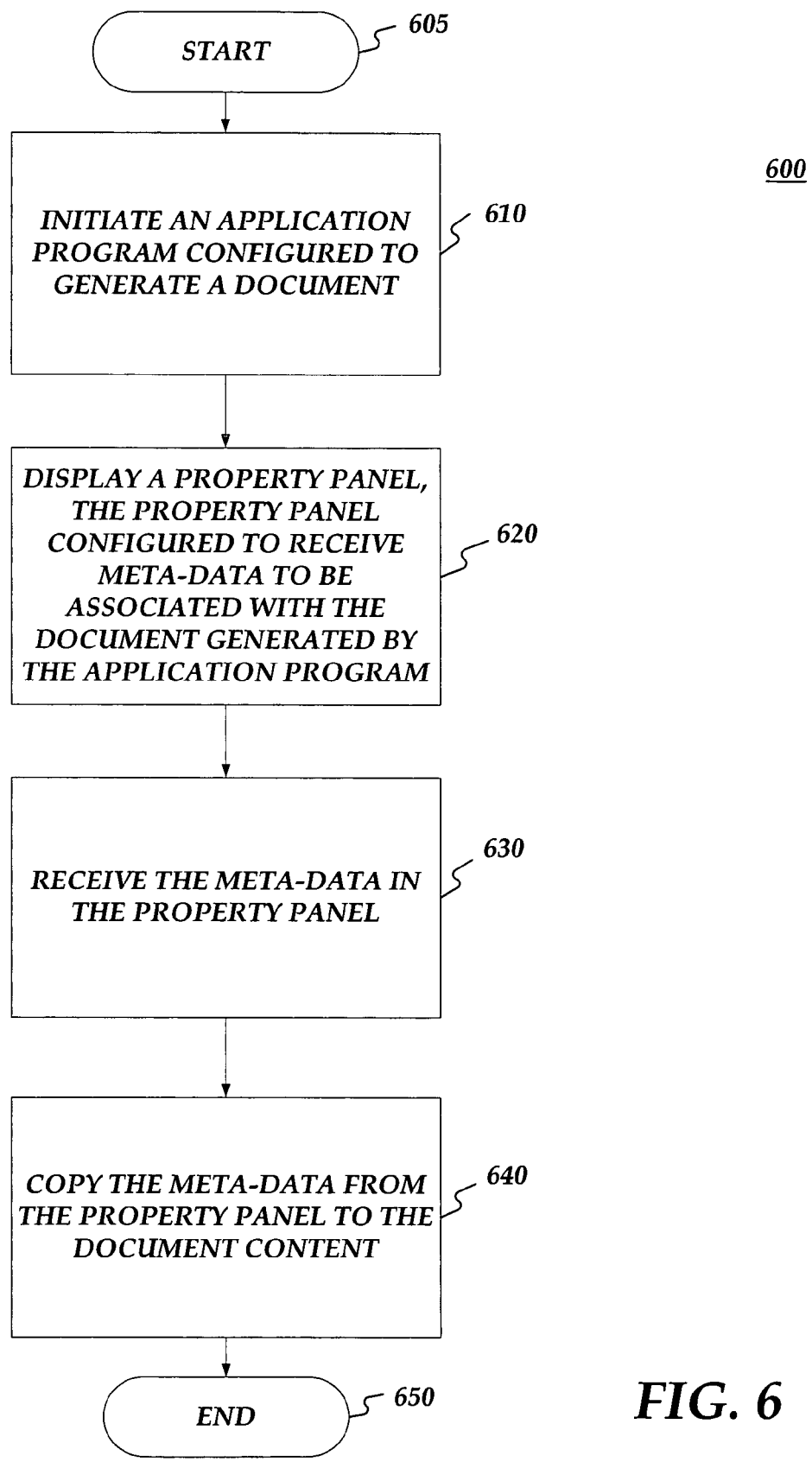
FIG. 6 is a flow chart of an exemplary method for incorporating meta-data in document consistent with an embodiment of the present invention.

FIG. 6 is a flow chart setting forth the general stages involved in an exemplary method 600 consistent with the invention for incorporating meta-data in a document content using system 100 of FIG. 1. Exemplary ways to implement the stages of exemplary method 600 will be described in greater detail below. Exemplary method 600 may begin at starting block 605 and proceed to stage 610 where computing device 100 may initiate an application program configured to generate a document. For example, a user may interact with computing device 100 through input device 112 to initiate application program 120. Application program 120's initiation may cause application program 120 to display a visual representation of the data file. For example, the data file may comprise a WORD ".doc" file and the visual representation may comprise a document that the user may wish to add content to.

From stage 610, where computing device 100 initiates the application program, exemplary method 600 may advance to stage 620 where computing device 100 may display a property panel. The property panel may be configured to receive meta-data to be associated with the document generated by application program 120. For example, an exemplary property panel is shown in FIG. 3 that may be displayed on one of output devices 114 when application program 120 is initiated. As shown in FIG. 3, the property panel may comprise, for example, a horizontal task-pane that may be docked above the document canvas and below the toolbar region of the application. The property panel may comprise a mode-less task pane that may be resized, moved, and hidden/shown at will by the user, for example.

Once computing device 100 displays the property panel in stage 620, exemplary method 600 may continue to stage 630 where computing device 100 may receive the meta-data in the property panel. For example, the user may enter the meta-data into the property panel shown on one of output device 114 using one of input devices 112.

After computing device 100 receives the meta-data in the property panel in stage 630, exemplary method 600 may proceed to stage 640 where computing device 100 may copy the meta-data from the property panel to the document content. For example, consistent with embodiments of the invention, a user may apply a reference throughout a document that refers to a piece of data that may be show in the property panel. In this way, if the user changes data in the property panel, it may change this data everywhere else in the document and vice versa. Consistent with embodiments of the invention, the data may be "dragged" and "dropped" from the data (properties) themselves. This may reduce the overhead for a user to setup a document to respect meta-data it may contain and may allow the user to just apply references throughout their document as easily as inserting any object into their document. Alternatively, consistent with embodiments of the invention, the meta-data may be copied from the document content to the property panel.

Figure 7:
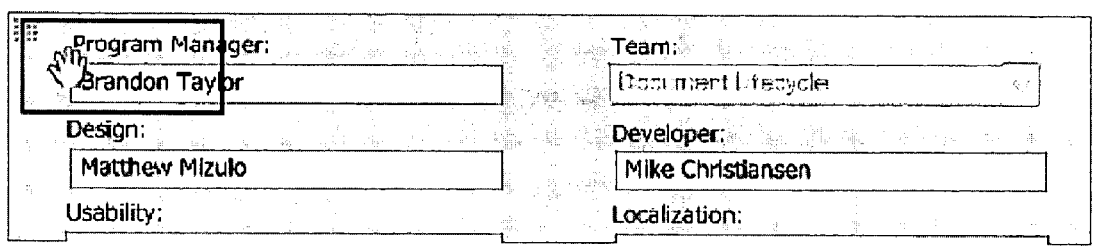
FIG. 7 is a screen shot illustrating an exemplary drag/drop operation consistent with an embodiment of the present invention.

FIG. 7 is a screen shot illustrating an exemplary drag/drop operation consistent with an embodiment of the present invention. For example, this operation may involve dragging/dropping properties that may be specified in the property panel into the document surface to associate those property references with locations within the document. To accomplish this, there may be user interface affordances in the property panel to indicate that a property value or a property name+value can be placed into the document content. This may be accomplished by a "hand" cursor that may be available when a control or value can be grabbed. The hand may appear simultaneously with a box overlay that may indicate the boundaries of the object being grabbed. If a user tries to drop a control into a situation that does not make sense, an "x" icon, for example, may be displayed that may indicate the operation will not work when the user lets go (attempts to drop.)

Consistent with embodiments of the invention, the aforementioned drag/drop operation may allow the ability to either grab the "value" or the "title+value". For an example of a "value" operation, as shown in FIG. 7, the user may grab "Brandon Taylor" and then drop into a document. "Brandon Taylor" may be applied with a control associated with it. The control may be shown or not and may be hidden until the user hovers over the item itself. For an example of a title+value operation, a user may grab, as shown in FIG. 7, "Program Manager" and drop into the document. Consequently, the document may get "Program Manager: Brandon Taylor" where the data-bound field is around "Brandon Taylor" still (like above example), but the title may be included for accuracy. This operation may be performed, for example, if the user wanted to build up a table representation of the property panel in the document. After computing device 100 copies the meta-data from the property panel to the document content in stage 640, exemplary method 600 may then end at stage 650.

Figure 8:
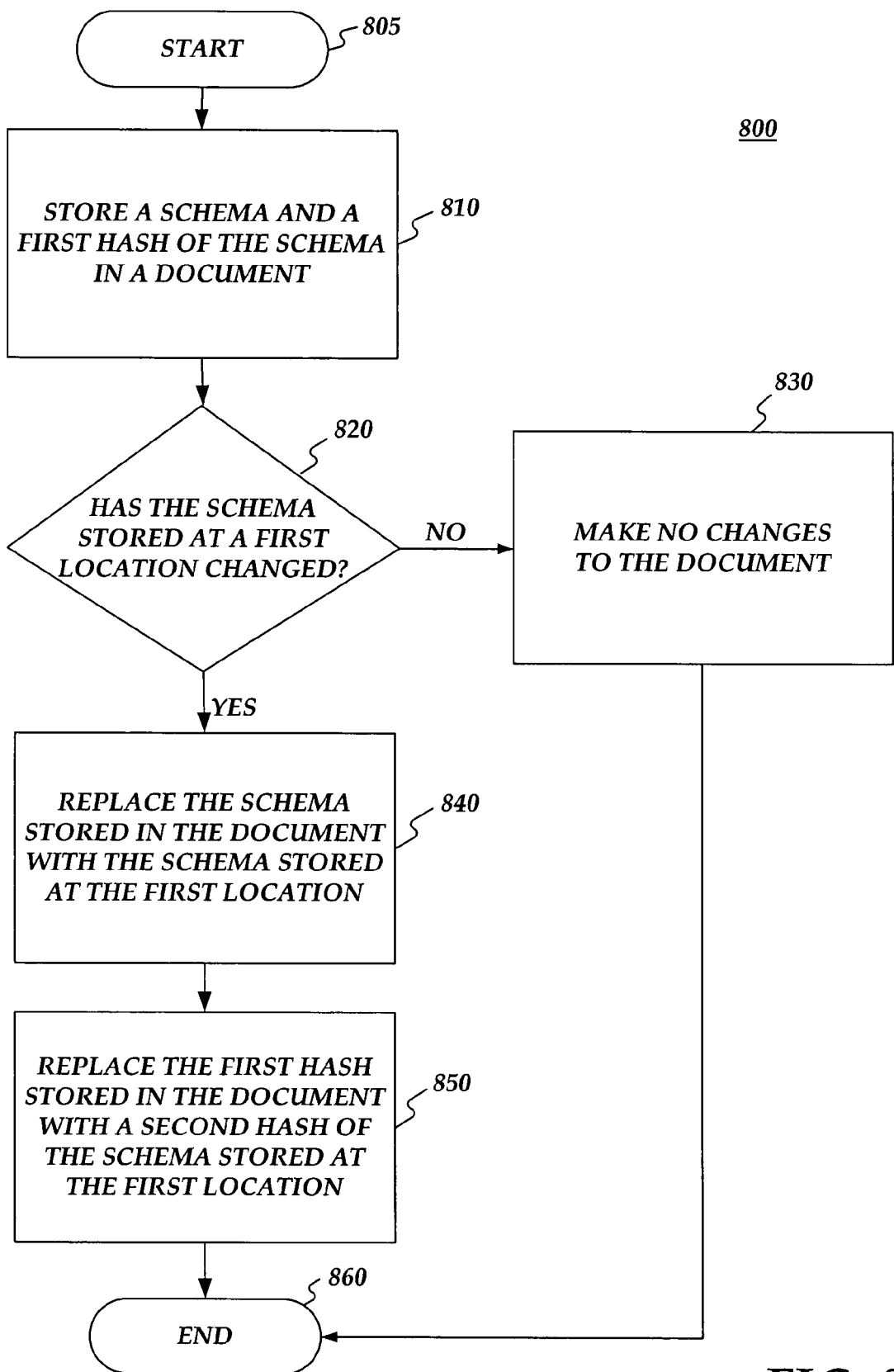
FIG. 8 is a flow chart of an exemplary method for creating document schema consistent with an embodiment of the present invention.
Figure 9:
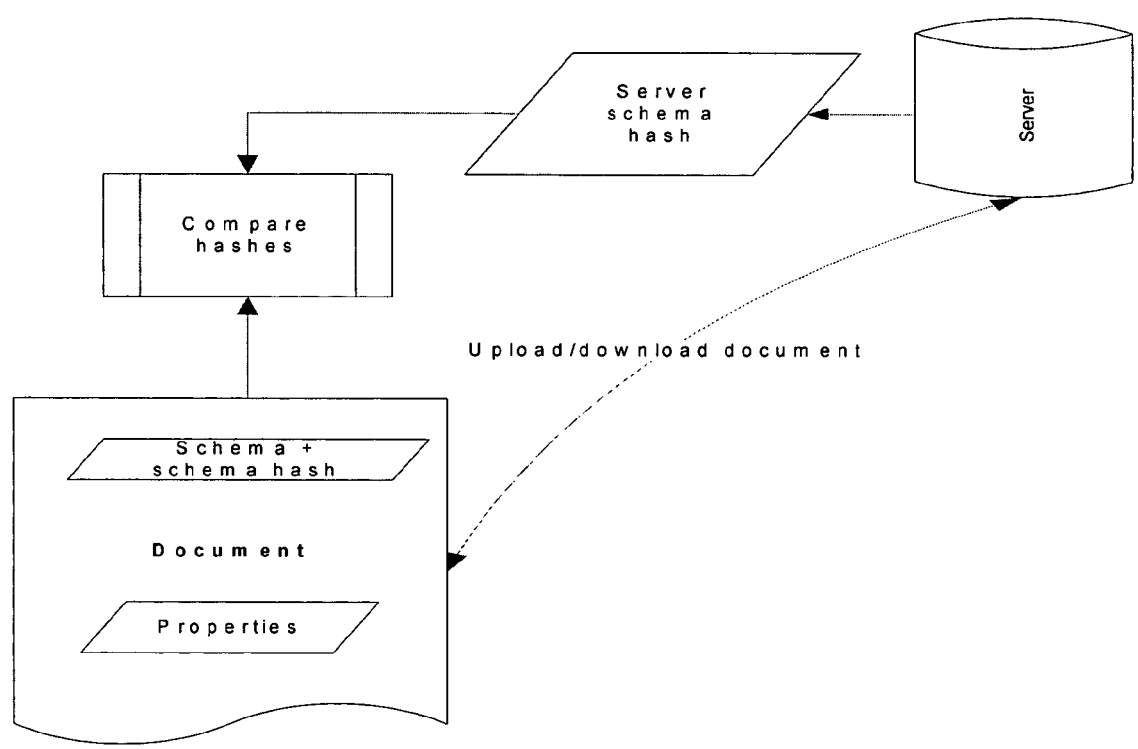
FIG. 9 is a diagram illustrating a process for updating schema when a document was downloaded and then uploaded consistent with an embodiment of the present invention.

FIG. 8 is a flow chart setting forth the general stages involved in an exemplary method 200 consistent with the invention for creating document schema using system 100 of FIG. 1. Exemplary ways to implement the stages of exemplary method 800 will be described in greater detail below. Exemplary method 800 may begin at starting block 805 and proceed to stage 810 where a server may store a schema and a first hash of the schema in a document. Embodiments of the invention may include computing device 100 being a client and one of other computing devices being the server. For example, as shown in FIG. 1, the server may comprise one of other computing devices 118 and may have a structure similar to computing device 100. Accordingly, the server may store a parser application ("the parser") in its corresponding system memory and execute the parser on its corresponding processing unit.

Once executed on the server, the parser may evaluate documents of a supported "file type" (e.g. .doc, .xml, etc.) stored on the server and then parse them for certain information. In this case, the information the parser may look for may comprise the document properties. For a given document, the parser may: i) determine when the schema corresponding to the property panel has been updated; ii) where to reference the schema that is within the document in question; and iii) how to store a newer version of the schema back into the document. In particular, the parser may create an XSD that represents the property panel's schema. This may allow the parser to put the XSD and XML for the properties into document and ultimately into a data store on the server.

As stated above, the schema may define the structure and the type of contents that each data element within the property panel may contain. The schema may be stored inside the document so that it can be referenced when the document isn't connected to a server (i.e. properties may be shown and entered while offline.) Second, a hash of the schema may be created that may be stored with the scheme. This hash may then be compared to a hash of the current schema stored on the server. In this way, each time the document is downloaded it may be discovered whether to update the schema or not (instead of always just updating it.)

From stage 810, where computing device 100 stores the schema and the first hash of the schema in the document, exemplary method 800 may advance to decision block 820 where computing device 100 may determine if the schema stored at a first location has changed. For example, whenever defined properties are updated (added, deleted, new type, new restrictions, etc.) on the server, the schema for those properties is updated. The parser may identify whether the schema stored in the document needs updating or is current with respect to the server schema.

If computing device 100 determines that the schema stored at the first location has not changed at decision block 820, exemplary method 800 may continue to stage 830 where computing device 100 may make no changes to the document. However, if computing device 100 determines that the schema stored at the first location has changed at decision block 820, exemplary method 800 may continue to stage 840 where computing device 100 may replace the schema stored in the document with the updated schema stored at the first location. For example, as stated above, the parser may identify whether the schema stored in the document is current with respect to the server schema. The parser may do this by comparing a hash that is stored as an attribute on the schema with a hash that is generated by the parser at run-time that reflects the latest schema. When the hashes match, the schema may be kept. When the hash is different, a new schema may then be placed into the document.

In conventional systems, properties were displayed by a server in a server based dialog on the client. If the server was offline or the user was viewing the document without a server connection, the user could not edit properties. Consistent with embodiments of the present invention, the property panel, which may comprise a client-side representation of the properties, may use schema to know what properties to show. Storing the schema inside the document may allow the property panel, for example, to reference the correct property schema in order to show the correct properties to the user with the correct restrictions applied (e.g. required, invalid, etc.).

From stage 830 where computer device 100 replaces the schema stored in the document, exemplary method 800 may proceed to stage 850 where computing device 100 may replace the first hash stored in the document with a second hash of the schema stored at the first location. For example, the parser may store the hash of the updated schema in the document once the document has been uploaded to the server. After computing device 100 replaces the first hash in stage 850, or if no changes are made to the document in stage 830, exemplary method 800 may then end at stage 860.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The present invention may be embodied as systems, methods, and/or computer program products. Accordingly, the present invention may be embodied in hardware and/or in software (including firmware, resident software, micro-code, etc.). Furthermore, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention are described above with reference to block diagrams and/or operational illustrations of methods, systems, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

While certain features and embodiments of the invention have been described, other embodiments of the invention may exist. Furthermore, although embodiments of the present invention have been described as being associated with data stored in memory and other storage mediums, aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A computer-implemented method for incorporating meta-data in document content, the method comprising:
    initiating an application program configured to generate a document;
    displaying on a client computing device, by the initiated application program, a property panel, the property panel containing data elements configured to receive meta-data to be associated with the document generated by the application program;
    storing a schema within the document, wherein the schema defines properties of each data element;
    storing a hash with the schema;
    receiving an indication on the client computing device whether the hash corresponds to a hash of the current schema stored on a server;
    in response to determining that the hash does not correspond to the hash of the current schema, downloading the current schema to the client computing device;
    binding the meta-data to a plurality of references in the document;
    referencing the schema stored within the document so the meta-data is rendered while the client computing device is in an offline state;
    receiving, in one of the references in the document or within the property panel, a user-specified change to the meta-data;

changing document content at the plurality of references in the document where the meta-data is bound to reflect the user-specified change to the meta-data; and changing meta-data displayed in the property panel to reflect the user-specified change.

2. The computer-implemented method of claim 1, wherein binding the meta-data to a plurality of references in the document further comprises executing a user initiated drag and drop operation from the property panel to the document content.

3. The computer-implemented method of claim 2, wherein executing the user initiated drag and drop operation further comprises executing the user initiated drag and drop operation copying one of: a value and a title plus the value.

4. The computer-implemented method of claim 1, wherein the data elements comprise at least one of the following: a specification title; a status; a program manager; a milestone; a developer; a priority; and a test.

5. The computer-implemented method of claim 1, wherein the property panel comprises a modeless horizontal task-pane displayed in the top portion of a display.

6. A system for incorporating meta-data in document content, the system comprising:
a memory storage for maintaining a database; and
a processing unit coupled to the memory storage, wherein the processing unit is configured to:
  (1) initiate an application program configured to generate a document;
  (2) display, by the initiated application program, a property panel, the property panel containing data elements configured to receive meta-data to be associated with the document generated by the application program;
  (3) store a schema within the document wherein the schema defines properties of each data element;
  (4) store a hash with the schema;
  (5) receive an indication on the client computing device whether the hash corresponds to a hash of the current schema stored on a server;
  (6) in response to determining that the hash does not correspond to the hash of the current schema, download the current schema to the client computing device;
  (7) bind the meta-data to a plurality of references in the document;
  (8) reference the schema stored within the document so the meta-data is rendered while the client computing device is in an offline state;
  (9) while the client computing device is still in an offline state display the meta-data in the plurality of references in the document where the meta-data is bound;
  (10) receive, in one of the references in the document or within the property panel, a user-specified change to the meta-data;
  (11) change document content at the plurality of references in the document where the meta-data is bound to reflect the user-specified change to the meta-data; and
  (12) change the meta-data displayed in the property panel to reflect the user-specified change.

7. The system of claim 6, wherein the processing unit being configured to bind the meta-data to a plurality of references in the document the meta-data further comprises the processing unit being configured to execute a user initiated drag and drop operation from the property panel to the document content.

8. The system of claim 7, wherein the processing unit being configured to execute the user initiated drag and drop operation further comprises the processing unit being configured to execute the user initiated drag and drop operation copying one of: a value and a title plus the value.

9. The system of claim 6, wherein the processing unit being configured to display the property panel further comprises the processing unit being configured to display the property panel comprising a modeless horizontal task-pane displayed in the top portion of a display.

10. A computer-storage media having computer-executable instructions embodied thereon for performing a method to store a set of instructions which, when executed, perform a method for incorporating meta-data in document content, the method executed by the set of instructions comprising:
initiating an application program configured to generate a document;
displaying, by the initiated application program, a property panel, the property panel containing data elements configured to receive meta-data to be associated with the document generated by the application program;
storing a schema within the document, wherein the schema defines properties of each data element;
storing a hash with the schema;
receiving an indication on the client computing device whether the hash corresponds to a hash of the current schema stored on a server;
in response to determining that the hash does not correspond to the hash of the current schema, downloading the current schema to the client computing device;
referencing the schema stored within the document so the meta-data is rendered while the client computing device is in an offline state;
receiving a user indication to drag the meta-data in the property panel into the document;
receiving a second user indication to drop the meta-data into the document, and based on the second user indication to drop the meta-data, binding the meta-data to a plurality of references in the document;
receiving, in one of the references in the document or within the property panel, a user-specified change to the meta-data;
changing document content at the plurality of references in the document where the meta-data is bound to reflect the user-specified change to the meta-data; and
changing meta-data displayed in the property panel to reflect the user-specified change,
upon the client computing device switching to an online state, transmitting the document.

11. The media of claim 10, wherein binding the meta-data to a plurality of references in the document further comprises executing a user initiated drag and drop operation from the property panel to the document content.

12. The media of claim 11, wherein executing the user initiated drag and drop operation further comprises executing the user initiated drag and drop operation copying one of: a value and a title plus the value.

13. The media of claim 10, wherein the data elements within the property panel comprise at least one of the following: a specification title; a status; a program manager; a milestone; a developer; a priority; and a test.

14. The media of claim 10, wherein the property panel comprises displaying the property panel comprising a modeless horizontal task-pane displayed in the top portion of a display.

* * * * *